United States Patent [19]

Berman et al.

[11] Patent Number: 5,738,039
[45] Date of Patent: Apr. 14, 1998

[54] PORTABLE PET BOWL

[76] Inventors: Paul Berman, 1133 N. Clark St., #203, Los Angeles, Calif. 90069; Darrell Greenland, 934 Fourth St., #21, Santa Monica, Calif. 90403; John Woods, 8033 Sunset Blvd., Suite 983, Los Angeles, Calif. 90046

[21] Appl. No.: 646,748

[22] Filed: May 3, 1996

Related U.S. Application Data

[63] Continuation-in-part of Ser. No. 499,936, Jul. 10, 1995, abandoned.

[51] Int. Cl.⁶ .................................................. A01K 7/00
[52] U.S. Cl. .................................................. 119/77; 119/72
[58] Field of Search .................................. 119/51.5, 52.1, 119/53, 74, 75, 72, 77; 111/7.2, 7.3; 47/48.5; 239/377, 378; 99/285

[56] References Cited

U.S. PATENT DOCUMENTS

| | | | |
|---|---|---|---|
| 367,456 | 8/1887 | Speicher et al. | 119/75 |
| 2,207,417 | 7/1940 | Smith | 119/52.1 X |
| 4,192,259 | 3/1980 | Clugston | 119/51.5 |
| 4,700,892 | 10/1987 | Cunning | 239/377 X |
| 4,721,063 | 1/1988 | Atchley | 119/52.1 |
| 4,947,796 | 8/1990 | Robinette | 119/51.1 |
| 5,226,574 | 7/1993 | Durinizi, Jr. | 239/377 X |
| 5,636,592 | 6/1997 | Wechsler | 119/52.1 |

Primary Examiner—Robert P. Swiatek
Assistant Examiner—Elizabeth Shaw

[57] ABSTRACT

A bowl for supplying drinking water to a pet. The inventive device includes a fluid reservoir having an open bowl projecting therefrom. A shared wall extends between the reservoir and the bowl and includes a fluid aperture directed therethrough. A valve assembly is mounted to the reservoir and can be manually operated to open and close the fluid aperture so as to permit transferring of fluid between the reservoir and the bowl.

7 Claims, 4 Drawing Sheets

5,738,039

1

PORTABLE PET BOWL

RELATED APPLICATION DATA

This case is a continuation-in-part of application Ser. No. 08/499,936 filed Jul. 10, 1995 now abandoned.

BACKGROUND OF THE INVENTION

1. Field of the Invention

The present invention relates to animal feeding devices and more particularly pertains to a portable pet bowl for supplying drinking water to a pet.

2. Description of the Prior Art

The use of animal feeding devices is known in the prior art. More specifically, animal feeding devices heretofore devised and utilized are known to consist basically of familiar, expected and obvious structural-configurations, notwithstanding the myriad of designs encompassed by the crowded prior art which have been developed for the fulfillment of countless objectives and requirements.

Known prior art animal feeding devices include U.S. Pat. No. 4,984,723; U.S. Pat. No. 4,880,112; U.S. Pat. No. 5,081,957; U.S. Pat. No. 5,105,768; U.S. Pat. No. 4,436,056; U.S. Pat. No. 5,209,184; U.S. Pat. No. 3,568,875 and U.S. Pat. No. 4,350,274.

While these devices fulfill their respective, particular objectives and requirements, the aforementioned patents do not disclose a portable pet bowl for supplying drinking water to a pet which includes a fluid reservoir having an open bowl projecting therefrom, with a shared wall extending between the reservoir and the bowl and including a fluid aperture directed therethrough, and a valve means mounted to the reservoir which can be manually operated for opening and closing a fluid aperture so as to permit transferring of fluid between the reservoir and the bowl.

In these respects, the portable pet bowl according to the present invention substantially departs from the conventional concepts and designs of the prior art, and in so doing provides an apparatus primarily developed for the purpose of supplying drinking water to a pet.

SUMMARY OF THE INVENTION

In view of the foregoing disadvantages inherent in the known types of animal feeding devices now present in the prior art, the present invention provides a new portable pet bowl construction wherein the same can be utilized for selectively supplying drinking water for consumption by a pet. As such, the general purpose of the present invention, which will be described subsequently in greater detail, is to provide a new portable pet bowl apparatus and methods which has many of the adavantages of the animal feeding devices mentioned heretofore and many novel features that result in a portable pet bowl which is not anticipated, rendered obvious, suggested, or even impled by any of the prior art animal feeding devices, either alone or in any combination thereof.

To attain this, the present invention generally comprises a bowl for supplying drinking water to a pet. The inventive device includes a fluid reservoir having an open bowl projecting therefrom. A shared wall extends between the reservoir and the bowl and includes a fluid aperture directed therethrough. A valve assembly is mounted to the reservoir and can be manually operated to open and close the fluid aperture so as to permit transferring There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new portable pet bowl apparatus and method which has many of the advantages of the animal-feeding devices mentioned heretofore and many novel features that result in a portable pet bowl which is not anticipated, rendered obvious, suggested, or even implied by any of the prior art animal feeding devices, either alone or in any combination thereof.

It is another object of the present invention to provide a new portable pet bowl which may be easily and efficiently manufactured and marketed.

It is a further object of the present invention to provide a new portable pet bowl which is of a durable and reliable construction.

An even further object of the present invention is to provide a new portable pet bowl which is susceptible of a low cost of manufacture with regard to both materials and labor, and which accordingly is then susceptible of low prices of sale to the consuming public, thereby making such portable pet bowls economically available to the buying public.

Still yet another object of the present invention is to provide a new portable pet bowl which provides in the apparatuses and methods of the prior art some of the advantages thereof, while simultaneously overcoming some of the disadvantages normally associated therewith.

Still another object of the present invention is to provide a new portable pet bowl for supplying drinking water to a pet.

Yet another object of the present invention is to provide a new portable pet bowl which includes a fluid reservoir having an open bowl projecting therefrom, with a shared wall extending between the reservoir and the bowl and including a fluid aperture directed therethrough, and a valve means mounted to the reservoir which can be manually operated for opening and closing a fluid aperture so as to permit transferring of fluid between the reservoir and the bowl.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and object there than those set forth above will become apparent when consideration is given to the following detailed description thereof. Such description makes reference to the annexed drawings wherein.

DESCRIPTION OF THE PREFERRED EMBODIMENT

Figure 1:
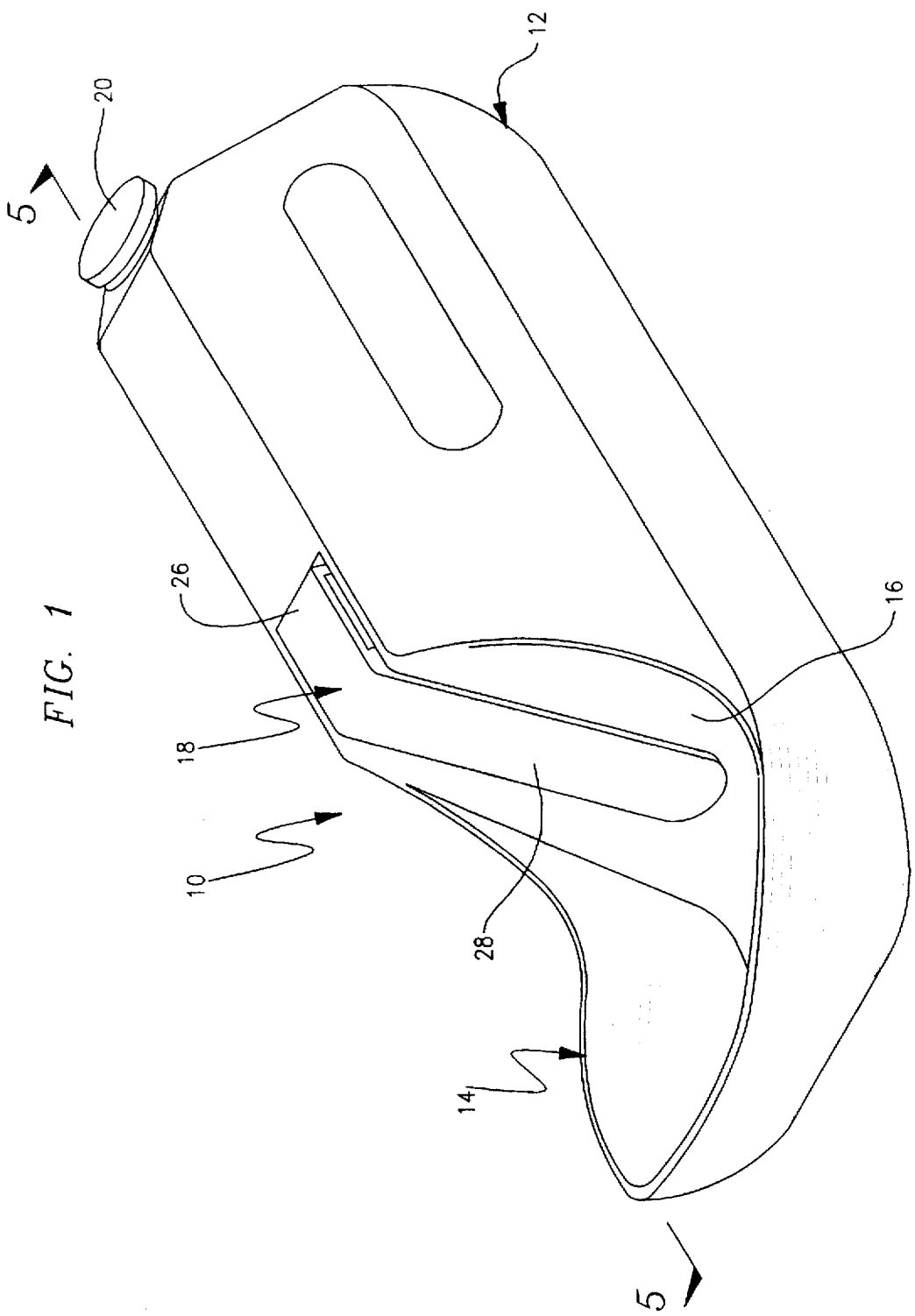
FIG. 1 is an isometric illustration of a portable pet bowl according to the present invention.
Figure 2:
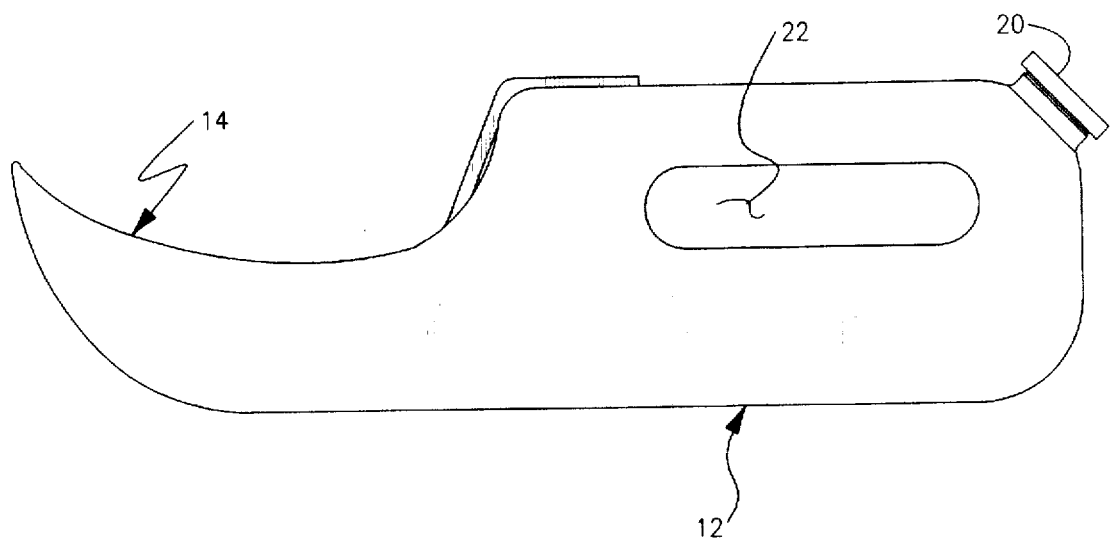
FIG. 2 is a side elevational view thereof.
Figure 3:
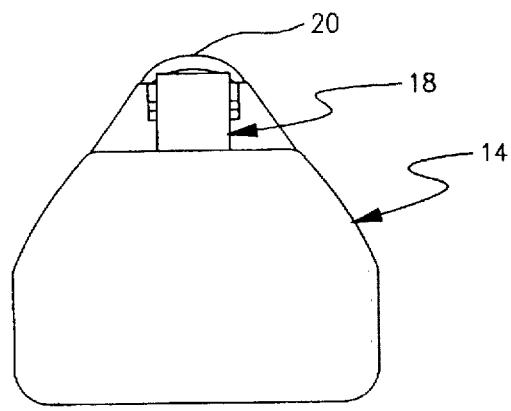
FIG. 3 is a front elevational view of the invention.
Figure 4:
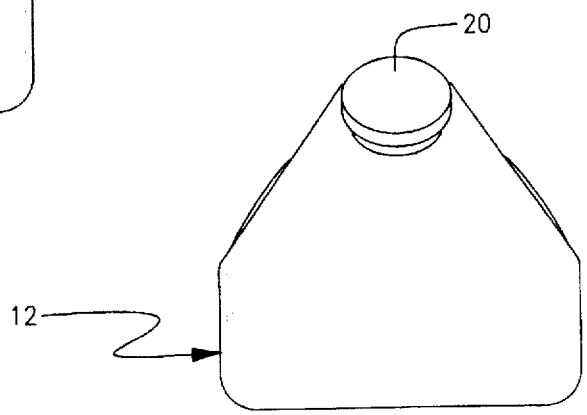
FIG. 4 is a rear elevation view thereof.

With reference now to the drawings, and in particular to FIGS. 1–6 thereof, a new portable pet bowl embodying the principles and concepts of the present invention and generally designated by the reference numeral 10 will be described.

More specifically, it will be noted that the portable pet bowl 10 comprises a fluid reservoir 12 for containing a volume of water or other fluids as desired by an end user. An open bowl 14 is coupled to and extends from the fluid reservoir 12 and is separated therefrom by a shared wall 16 as shown in FIG. 1 of the drawings. A valve means 18 is movably mounted relative to the fluid reservoir 12 and can be selectively manually operated to permit fluid communication between the fluid reservoir 12 and the open bowl 14 through the shared wall 16. By this structure, a quantity of water or other fluids can be contained within the fluid reservoir 12 for selective positioning into the open bowl 14 for subsequent consumption by a pet. Any remaining fluid not consumed by the pet residing within the open bowl 14 can then be repositioned back into the fluid reservoir 12 through an operation of the valve means 18 and a manual manipulation of the device 10 causing a gravity induced flow of fluid from the open bowl 14 to the fluid reservoir 12.

Referring now to FIGS. 2 through 6 wherein the present invention 10 is illustrated in detail, it can be shown that the fluid reservoir 12 includes a removable cap 20 which is preferably threadably coupled thereto and can be selectively removed to permit depositing of fluid such as water or the like into the fluid reservoir 12. To permit for ease of manual manipulation of the present invention 10, the fluid reservoir 12 is preferably shaped so as to define a sealed handle aperture 22 extending transversely therethrough which separates the fluid reservoir 12 into a main volume and a vent conduit 24. Preferably, the fluid reservoir 12 and the open bowl 14 are integrally formed as a single unit from a plastic or polymeric material.

Figure 5:
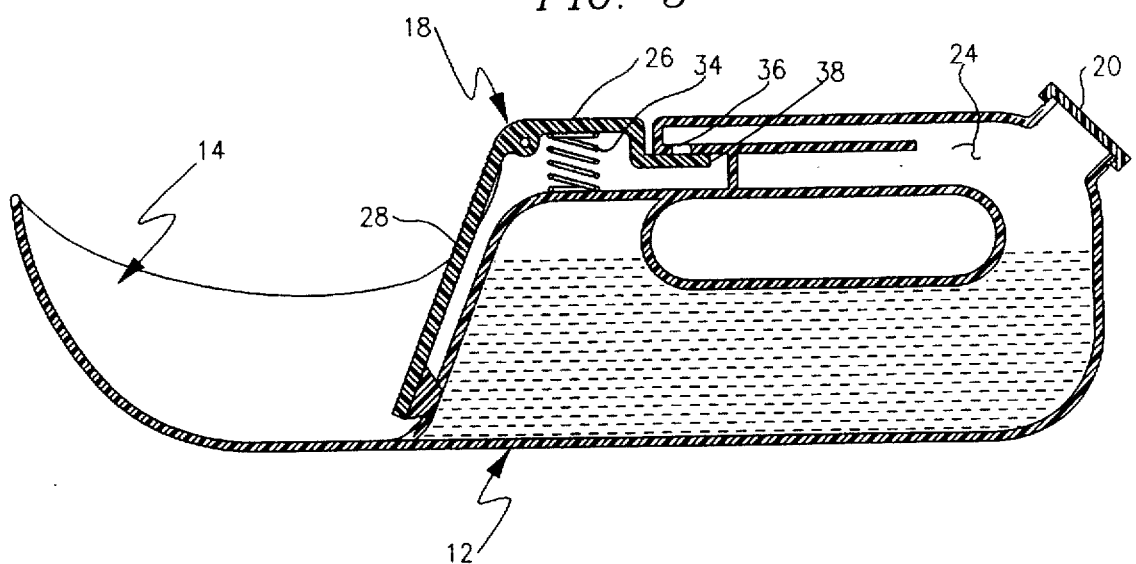
FIG. 5 is a cross sectional view taken along line 5—5 of FIG. 1.
Figure 6:
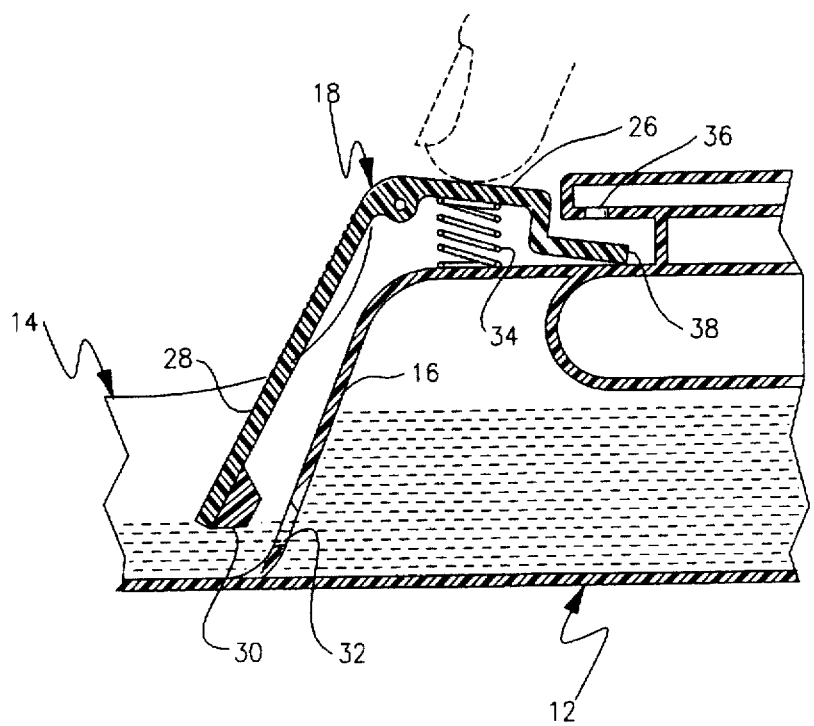
FIG. 6 is an enlarged cross sectional view illustrating operation of a valve means of the invention.

With continuing reference to FIG. 5 and 6, it can be shown that the valve means 18 of the present invention 10 preferably comprises an actuating lever 26 which is pivotally mounted relative to the fluid reservoir 12. A fluid aperture cover plate 28 extends from the actuating lever 26 and includes a sealing plug 30 projecting into a fluid aperture 32 directed through the shared wall 16. A spring 34 is interposed between the actuating lever 26 and a portion of the fluid reservoir 12 so as to bias the fluid aperture cover plate 28 and the sealing plug 30 towards the fluid aperture 32 to preclude fluid communication across the shared wall 16. By this structure, a manual depressing of the actuating lever 26 will effect pivoting of the fluid aperture cover plate 28 and the attached sealing plug 30 from the fluid aperture 32 so as to permit fluid communication between the fluid reservoir 12 and the open bowl 14 as shown in FIG. 6 of the drawings.

To permit for ease of transferring of fluid between the fluid reservoir 12 and the open bowl 14, the vent conduit 24 is preferably positioned into fluid communication with the ambient atmosphere during operation of the actuating lever 26 of the valve means 18. To this end, a vent aperture 36 is directed through an upper portion of the fluid reservoir 12 and extends into fluid communication with the vent conduit 24 thereof. A vent aperture cover plate 38 is mounted to the actuating lever 26 and positioned for abutting engagement with the vent aperture 36 when the fluid aperture cover plate 28 and the sealing plug 30 are positioned against the fluid aperture 32. By this structure, the vent aperture 36 is normally closed by the vent aperture cover plate 38 when the sealing plug 30 is positioned within the fluid aperture 32. However, when the actuating lever 26 is depressed to remove the sealing plug 30 from the fluid aperture 32, the vent aperture cover plate 38 is spaced from the vent aperture 36 so as to permit fluid or gaseous communication between an interior of the fluid reservoir 12 and a surrounding ambient atmosphere through the vent aperture 36 to permit ease of fluid flow from the fluid reservoir 12 to the open bowl 14 through the fluid aperture 32.

It should also be noted that the fluid reservoir 12 can be vented to the ambient atmosphere through a variety of alternative means. For example, a one-way check valve can be mounted within the cap 20 or otherwise extend between the fluid reservoir 12 and the ambient atmosphere or exterior of the device 10 so as to permit venting air to enter the fluid reservoir 12 as fluid flows from the fluid reservoir into the open bowl 14. Further, it is contemplated that a permeable film such as is sold under the trademarked name "GORTEX" can be positioned over an aperture directed through either the cap 20 or an aperture directed through the fluid reservoir 12. Moreover, the cap or fluid reservoir 12 may simply include a small aperture or pinhole directed therethrough permitting an entrance of venting air during use of the device 10.

In use, the portable pet bowl 10 of the present invention can be easily utilized for supplying drinking water to a pet as desired by an end user. To this end, fluid residing within the fluid reservoir 12 can be selectively dispensed into the open bowl 14 through an actuation of the valve means 18 as described above. Subsequent to use of the device 10 by a pet, any remaining fluid residing within the open bowl 14 can be drained back into the fluid reservoir 12 through an actuation of the valve means 18 and a tilting of the device 10 causing a gravitationally induced flowing of the water or other fluids back into the fluid reservoir 12. To facilitate ease of transportation of the present invention during periods of non-use thereof, it is contemplated that the device 10 may further include a carrying strap removably attached to the fluid reservoir 12 or the open bowl 14. To this end, the cap 20 may include an annular ring pivotally mounted thereto from which the strap extends.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Figure 7:
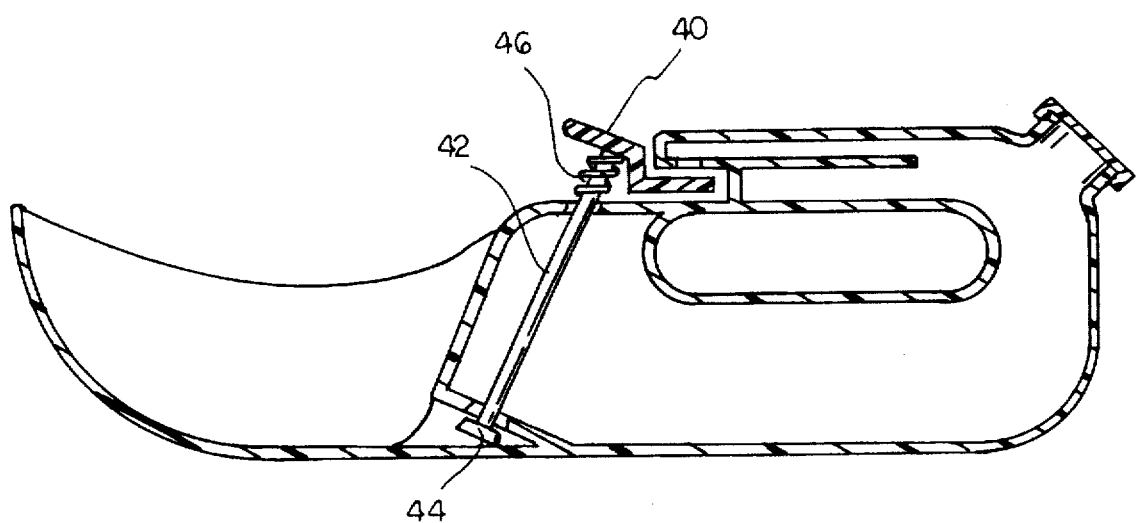
FIG. 7 is a cross sectional view of an alternative valve arrangement.

An alternative valving arrangement is depicted in FIG. 7. This embodiment incorporates an actuating button 40 which is slidably mounted relative to the fluid reservoir. Additionally, a fluid aperture engaging piston 42 extends from the actuating button 40. A sealing plug 44 is positioned at the distal extend of the piston and is adapted to be projected into the fluid aperture directed through the shared wall. A spring 46 is interposed between the actuating button 40 and a portion of the fluid reservoir so as to bias the fluid aperture engaging piston 42 and the sealing plug 44 axially towards the fluid aperture and thus preclude fluid communication across the shared wall.

With either of the two valving arrangements heretofore described, the valve can be actuated and the device carried with a single hand. This arrangement is achieved by positioning the valve means adjacent to the sealed handle. Thus, a user may engage the handle and the valve with a single hand. The close proximity between the handle and valve means also enables the valve means to be operably connected to the sealed handle aperture. Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A portable pet bowl device comprising:
   a fluid reservoir for containing a volume of fluid:
   an open bowl coupled to and extending from the fluid reservoir, the bowl being separated from the reservoir by a shared wall, the shared wall having a fluid aperture directed therethrough permitting communication between an interior of the reservoir and the bowl;
   a valve means movably mounted relative to the fluid reservoir for selectively manually controlling fluid communication between the fluid reservoir and the open bowl through the fluid aperture in the shared wall; said valve means comprising an actuating lever pivotally mounted relative to the fluid reservoir; a fluid aperture cover plate extending from the actuating lever and including a sealing plug projecting into the fluid aperture directed through the shared wall; a spring interposed between the actuating lever and a portion of the fluid reservoir so as to bias the fluid aperture cover plate and the sealing plug towards the fluid aperture to preclude fluid communication across the shared wall.

2. The portable pet bowl device of claim 1, wherein the fluid reservoir is shaped so as to define a sealed handle aperture extending transversely therethrough which separates the fluid reservoir into a main volume and a vent conduit.

3. The portable pet bowl device of claim 2, wherein the vent conduit includes a vent aperture extending into fluid communication with an ambient atmosphere surrounding an exterior of the device; and further wherein the valve means further comprises a vent aperture cover plate mounted to the actuating lever and positioned for abutting engagement with the vent aperture when the fluid aperture cover plate and the sealing plug are positioned against the fluid aperture such that the vent aperture is normally closed by the vent aperture cover plate when the sealing plug is positioned within the fluid aperture, with a depression of the actuating lever removing the sealing plug from the fluid aperture and spacing the vent aperture cover plate from the vent aperture so as to permit gaseous communication between an interior of the fluid reservoir and the ambient atmosphere through the vent aperture.

4. The portable pet bowl device of claim 3, wherein the vent aperture is directed through an upper portion of the fluid reservoir and extends into fluid communication with the vent conduit.

5. The portable pet bowl device as described in claim 4, wherein:
   the valve means comprises an actuating button slidably mounted relative to the fluid reservoir; a fluid aperture engaging piston extending from the actuating button and including a sealing plug projecting into the fluid aperture; a spring interposed between the actuating button and a portion of the fluid reservoir so as to bias the fluid aperture engaging piston and the sealing plug towards the fluid aperture to preclude fluid communication.

6. A portable pet bowl device adapted to be engaged by the hand of a user comprising:
   a fluid reservoir for containing a volume of fluid:
   an open bowl coupled to and extending from the fluid reservoir, a fluid aperture permitting communication between an interior of the reservoir and the bowl;
   a handle interconnected to the fluid reservoir;
   a valve means movably mounted relative to the fluid reservoir for selectively manually controlling fluid communication between the fluid reservoir and the open bowl through the fluid aperture, the valve means being operably connected to the handle.

7. A portable pet bowl device adapted to be engaged by the hand of a user comprising:
   a fluid reservoir for containing a volume of fluid:
   an open bowl coupled to and extending from the fluid reservoir, a fluid aperture permitting communication between an interior of the reservoir and the bowl;
   a handle interconnected to the fluid reservoir;
   a valve means movably mounted relative to the fluid reservoir for selectively manually controlling fluid communication between the fluid reservoir and the open bowl through the fluid aperture, wherein the valve is proximate to the handle such that the user can engage the handle and valve with a single hand.

* * * * *